United States Patent [19]

Nakamura et al.

[11] Patent Number: 4,978,164
[45] Date of Patent: Dec. 18, 1990

[54] MODULAR VEHICLE BODY STRUCTURE

[75] Inventors: Katsumi Nakamura, Fujisawa; Kenichi Miyazaki, Sagamiha; Taro Hagiwara, Sagamihara; Hiroshi Kuriyama, Yokohama, all of Japan

[73] Assignee: Nissan Motor Co., Ltd., Yokohama, Japan

[21] Appl. No.: 173,460

[22] Filed: Mar. 25, 1988

[30] Foreign Application Priority Data

Mar. 26, 1987 [JP] Japan .................................. 62-70485
Apr. 22, 1987 [JP] Japan .................................. 62-60958

[51] Int. Cl.$^5$ ........................................... B62D 25/00
[52] U.S. Cl. .................... 296/197; 296/203; 156/92
[58] Field of Search ................. 296/29, 192, 193–197, 296/203, 210; 156/92

[56] References Cited

U.S. PATENT DOCUMENTS

| | | | |
|---|---|---|---|
| 2,072,842 | 1/1934 | Trautvetter | 296/210 |
| 2,389,907 | 11/1945 | Helmuth | 296/203 |
| 2,425,948 | 8/1947 | Lucien | 180/11 |
| 2,700,570 | 1/1955 | Barenyi | 296/196 |
| 2,988,397 | 6/1961 | Brueder | 296/196 |
| 3,021,172 | 2/1962 | Fiala et al. | 296/203 |
| 3,022,105 | 2/1962 | Tjaarda | 29/469 X |
| 3,326,599 | 6/1967 | Pashenee | 296/137 |
| 3,541,668 | 11/1970 | Wessells, III et al. | 29/469 |
| 3,827,137 | 8/1974 | Schubach | 29/469 |
| 3,882,592 | 5/1975 | Mooney et al. | 29/469 |
| 4,121,870 | 10/1978 | Oakey | 296/218 X |
| 4,252,364 | 2/1981 | Toyama et al. | 296/185 |
| 4,355,844 | 10/1982 | Muzzarelli | 296/205 |
| 4,391,465 | 7/1983 | Piano | 296/208 |
| 4,405,173 | 9/1983 | Piano | 296/146 |
| 4,422,685 | 12/1983 | Bonfilio et al. | 296/197 |
| 4,573,734 | 3/1986 | Gass | 296/189 |
| 4,590,654 | 5/1986 | Kajiura | 29/407 |
| 4,613,184 | 9/1986 | Rispeter et al. | 296/187 |
| 4,634,173 | 1/1987 | Aonuma et al. | 296/188 |
| 4,730,870 | 3/1988 | DeRees | 296/197 |
| 4,759,489 | 7/1988 | Pigott | 228/102 |

FOREIGN PATENT DOCUMENTS

| | | |
|---|---|---|
| 75754 | 4/1983 | European Pat. Off. . |
| 76934 | 4/1983 | European Pat. Off. . |
| 111457 | 6/1984 | European Pat. Off. . |
| 141581 | 5/1985 | European Pat. Off. . |
| 141959 | 5/1985 | European Pat. Off. . |
| 163991 | 12/1985 | European Pat. Off. . |
| 170150 | 2/1986 | European Pat. Off. . |
| 178266 | 4/1986 | European Pat. Off. . |
| 180554 | 5/1986 | European Pat. Off. . |
| 188837 | 7/1986 | European Pat. Off. . |
| 193499 | 9/1986 | European Pat. Off. . |
| 199970 | 12/1986 | European Pat. Off. . |
| 203484 | 12/1986 | European Pat. Off. . |
| 233670 | 8/1987 | European Pat. Off. . |
| 240470 | 10/1987 | European Pat. Off. . |
| 243325 | 10/1987 | European Pat. Off. . |
| 2057307 | 5/1972 | Fed. Rep. of Germany ...... 296/196 |

(List continued on next page.)

OTHER PUBLICATIONS

"Unique Welding Line Boosts Body Quality", *Automotive Engineering* Feb., 1985, pp. 96–102.
*Automotive Engineering*, vol. 91, No. 3, Mar. 1983, pp. 50–52.

*Primary Examiner*—Dennis H. Pedder
*Attorney, Agent, or Firm*—Foley & Lardner, Schwartz, Jeffery, Schwaab, Mack, Blumenthal & Evans

[57] ABSTRACT

A vehicle body consists of a plurality of independent body sections, i.e., an engine compartment assembly, floor assembly, a pair of body side assemblies and a roof assembly. The assemblies are prepared and painted independently and have joining portions which are to be lapped one upon another, respectively. The assemblies are joined together by fastening with bolts and nuts the joining portions while at the same time bonding the joining portions with a sealant adhesive which is applied to the joining portions prior to lapping the joining portions one upon another.

4 Claims, 6 Drawing Sheets

FOREIGN PATENT DOCUMENTS

| | | | |
|---|---|---|---|
| 2923874 | 1/1981 | Fed. Rep. of Germany | 296/197 |
| 3119666 | 1/1982 | Fed. Rep. of Germany . | |
| 3119572 | 3/1982 | Fed. Rep. of Germany . | |
| 3143503 | 6/1982 | Fed. Rep. of Germany . | |
| 3725807 | 2/1988 | Fed. Rep. of Germany . | |
| 127225 | 12/1984 | France . | |
| 2581983 | 11/1986 | France . | |
| 256931 | 2/1988 | France . | |
| 55-36117 | 3/1980 | Japan . | |
| 59-114165 | 7/1984 | Japan . | |
| 61-92965 | 10/1986 | Japan . | |
| WO85/05604 | 12/1985 | PCT Int'l Appl. . | |
| WO87/03846 | 7/1987 | PCT Int'l Appl. . | |
| 626305 | 7/1949 | United Kingdom . | |
| 701413 | 12/1953 | United Kingdom . | |
| 737655 | 9/1955 | United Kingdom . | |
| 805024 | 11/1958 | United Kingdom . | |
| 1488793 | 10/1977 | United Kingdom . | |
| 2096066 | 10/1982 | United Kingdom . | |
| 2108912 | 5/1983 | United Kingdom . | |
| 2115753 | 9/1983 | United Kingdom . | |
| 2117329 | 10/1983 | United Kingdom . | |
| 2119839 | 11/1983 | United Kingdom . | |
| 2142588 | 1/1985 | United Kingdom . | |
| 2150088 | 6/1985 | United Kingdom . | |
| 2187683 | 9/1987 | United Kingdom . | |

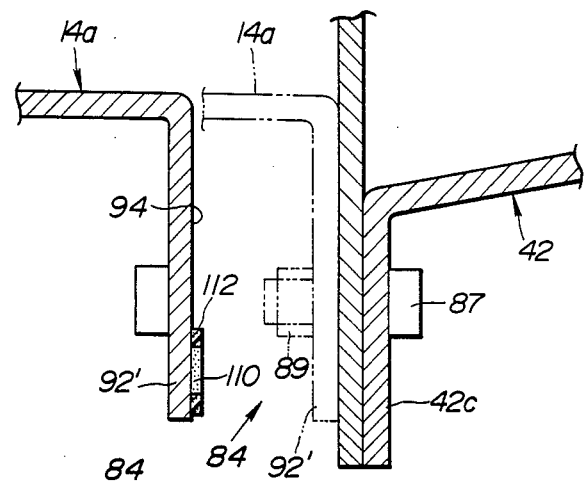
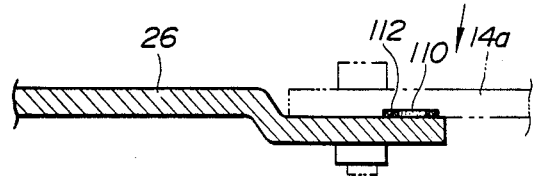
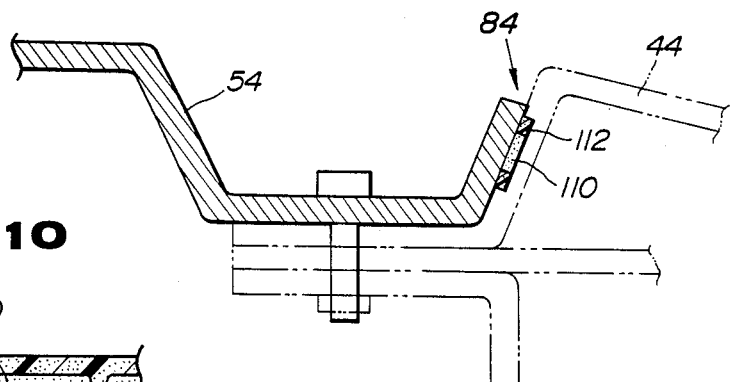
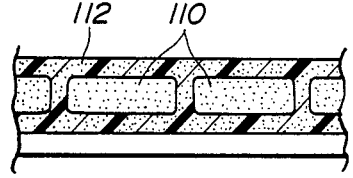

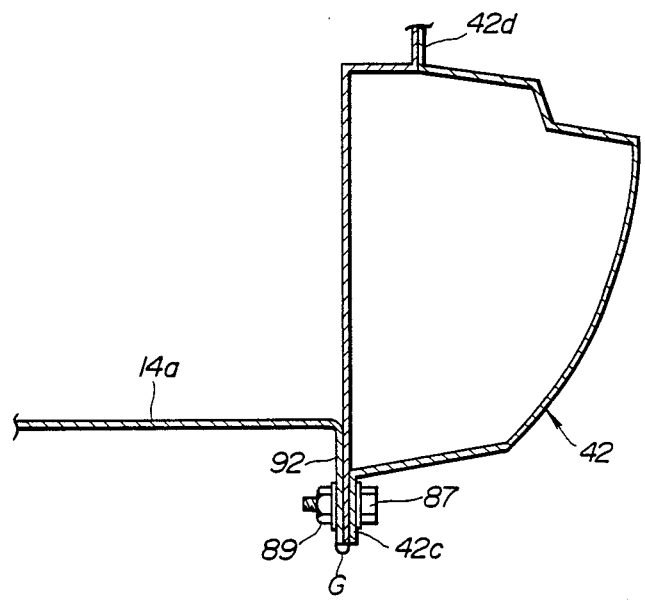

MODULAR VEHICLE BODY STRUCTURE

BACKGROUND OF THE INVENTION

1. Field of the Invention

The present invention relates to a modular vehicle body structure and a method of producing the same.

2. Description of the Prior Art

Unitized bodies have been used for many of automobiles, particularly for most passenger cars. The unitized bodies however have a difficulty in installation of components and inspection of same since access to the spaces for disposition of the components is obstructed by the body section enclosing the spaces. For example, installation of some devices, components or upholsteries requires a worker to get into a vehicle cabin or to get his hands into a vehicle cabin through an opening of a vehicle body, resulting in the necessity of an awkward, difficult and time-consuming work and therefore an expensive assembly work.

The unitized bodies further require an awkward, difficult and time-consuming work for providing seals to the spot-welded portions of the vehicle body. For example. FIG. 11 shows a side sill "C" and a floor panel "A" which are joined together by spot-welding. In order to provide a seal between the side sill "C" and the floor panel "A", a sealant "G" needs to be applied to the joining portions after the spot-welding.

SUMMARY OF THE INVENTION

In accordance with the present invention, there is provided a novel vehicle body structure which is constituted of a plurality of independent body sections, i.e., an engine compartment assembly, floor assembly, a pair of body side assemblies and a roof assembly.

The engine compartment assembly has a cowl box and a dash lower panel. The floor assembly has a front floor panel and a rear floor panel. Each of the body side assemblies has a front pillar, rear pillar, roof side rail and a side sill. The roof assembly has a roof panel.

The engine compartment assembly, floor assembly, body side assemblies and roof assembly are painted independently and provided with joining portions which are respectively lapped one upon another.

The joining portions are joined together by first joining means using bolts and nuts and by second joining means using a sealant adhesive.

The sealant adhesive is applied in place between the joining portions prior to the joining by the first joining means.

In accordance with the present invention, there is further provided a novel method of producing a vehicle body.

The method comprises preparing an engine compartment assembly, floor assembly, a pair of body side assemblies and a roof assembly which constitute independent body sections and have joining portions which are lapped one upon another, respectively, painting the engine compartment assembly, body side assemblies and roof assembly, applying an adhesive sealant to the joining portions, and fastening with bolts and nuts the joining portions while at the same time bonding the joining portions with the sealant adhesive.

The above structure is effective for attaining a vehicle body which is free from the above noted problems.

It is accordingly an object of the present invention to provide a novel vehicle body structure which can attain the installation and inspection of devices, components and upholsteries with ease and efficiency and furthermore can attain its sealing with ease and efficiency.

It is another object of the present invention to provide a novel vehicle body structure which can attain sealing and bonding of its joining portions at the same time.

It is a further object of the present invention to provide a novel vehicle body structure which can be produced with ease and efficiency.

It is a further object of the present invention to provide a novel vehicle body structure which can reduce the assembling expense considerably.

It is a further object of the present invention to provide a novel vehicle body structure which is suited for manufacture and assembly using robots.

It is a further object of the present invention to provide a novel vehicle body structure which makes it possible to attain various types of vehicles with ease and efficiency.

It is a further object of the present invention to provide a novel method of producing a vehicle body of the above described character.

BRIEF DESCRIPTION OF THE DRAWINGS

FIG. 7 is an enlarged sectional view of a portion of the modular vehicle body of FIG. 2 in which the sealing system according to a further emboidment of the present invention is incorporated;

FIG. 8 is an enlarged sectional view of another portion of the modular vehicle body of FIG. 2 in which the sealing system of FIG. 7 is incorporated;

FIG. 9 is an enlarged sectional view of a further portion of the modular vehicle body of FIG. 2 in which the sealing system of FIG. 7 is incorporated;

FIG. 10 is a fragmentary sectional view of two kinds of adhesive sealants applied in a particular form and utilized in the sealing system of FIG. 7;

FIG. 12 is a sectional view of a portion of a modular vehicle body incorporating a prior art sealing system.

DETAILED DESCRIPTION OF THE PREFERRED EMBODIMENTS

Figure 1:
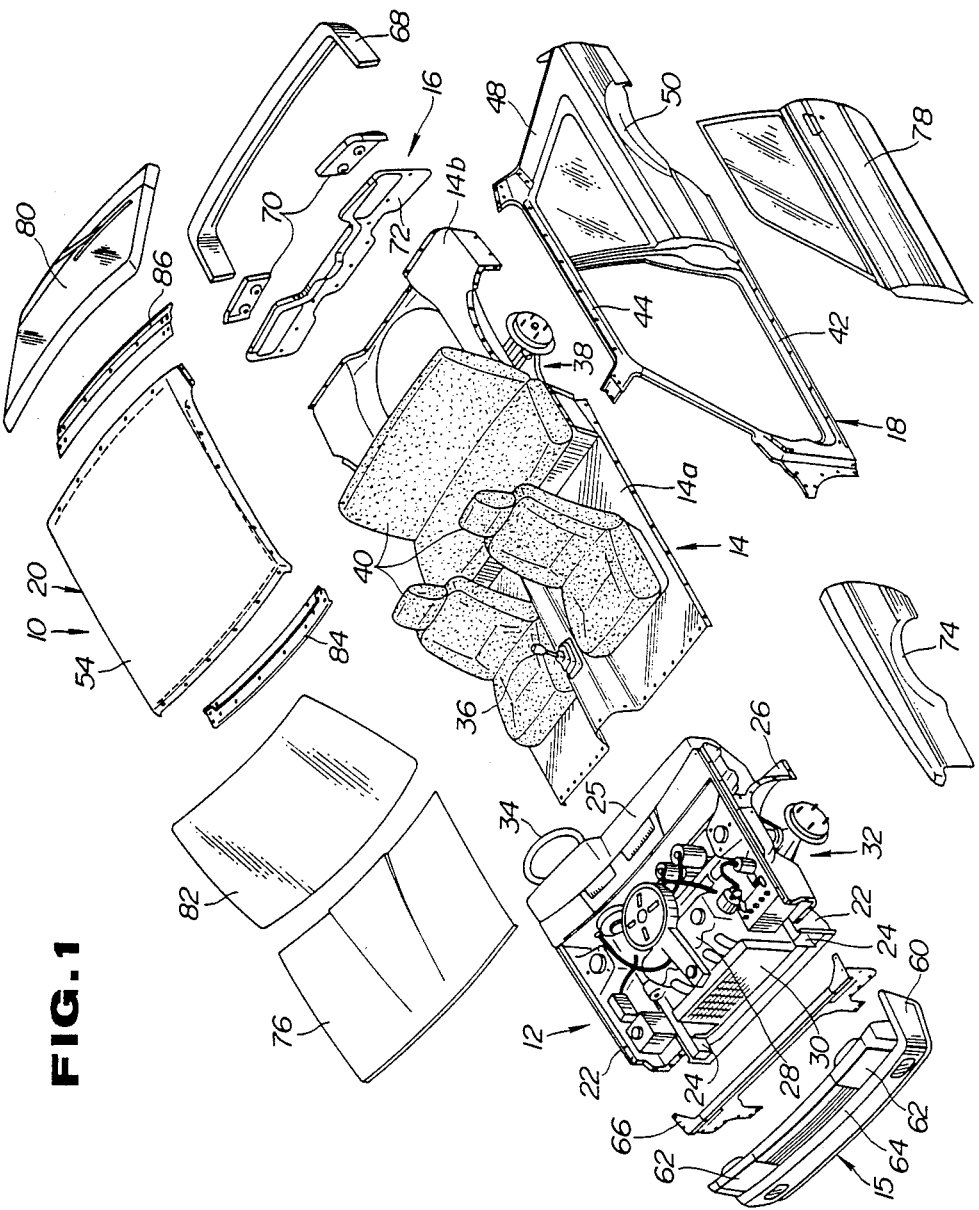
FIG. 1 is an exploded view of a modular vehicle body incorporating a sealing system of the present invention.

Referring first to FIGS. 1, a modular vehicle body structure 10 is constituted by a plurality of independent vehicle body sections, i.e., an engine compartment assembly 12, floor assembly 14, front end assembly 15, rear end assembly 16 and a pair of body side assemblies, though only one 18 is shown, and a roof assembly 20.

The engine compartment assembly 12 includes a pair of hood ledge panels 22 and 22, a pair of longitudinal members 24 and 24, cowl box or air box 25, dash lower panel 26, etc. which are welded together. The engine compartment assembly 12 is equipped with devices, components and upholsteries as an engine 28, radiator 30, electric accessaries (no numeral), front suspension 32, steering wheel 34, etc.

The floor assembly 14 includes a front floor panel 14a and a rear floor panel 14b which are joined together to constitute an integral unit. The floor assembly 14 is equipped with devices, components and upholsteries such as a gear shift unit 36, a rear suspension 38 and seats 40, etc.

Each body side assembly 18 includes a side sill 42, roof side rail 44, front pillar 46, center pillar 47, rear pillar 48, rear fender 50, etc. The body side assembly 18 is equipped with devices, components and upholsteries such as a body side trim member 52 (refer to FIG. 2), sun visor (not shown), etc.

The roof assembly 20 includes a roof panel 54 and roof bows (not shown) secured to the roof panel 54. The roof assembly 20 is painted and equipped with devices, components and upholsteries such as, though not shown, a room lamp, roof trim 58, etc.

The front end assembly 15 includes a front bumper 60, head lamp 62, front grille 64, radiator core support 66, etc.

The rear end assembly 16 includes a rear bumper 68, rear combination lamp 70, rear panel 72, etc.

A front fender 74, engine hood 76, front doors though only one 78 is shown, back door 80, windshield 82, etc. are installed in place after the foregoing assemblies are joined together to constitute a nearly complete vehicle structure.

The engine compartment assembly 12 is joined with the floor assembly 14 in the manner of butt joint. More specifically, the engine compartment assembly 12 and floor assembly 14 are joined together by fastening the lower end of the dash lower panel 26 and the front end of the front floor panel 14a which are laid one upon the other with bolt and nuts.

Each body side assembly 18 is placed on the lateral ends of the engine compartment assembly 12 and the floor assembly 14 and fastened thereto with bolts and nuts.

The roof assembly 20 is placed on the upper ends of the body side assemblies 18 and fastened with bolts and nuts to same together with the front roof rail 84 and rear roof rail 86.

The front end assembly 15 is placed on the front end of the engine compartment assembly 12 and fastened to same with bolts and nuts whilst the rear end assembly 16 is placed on the rear ends of the floor assembly 14 and the body side asesmblies 18 and fastened to same with bolts and nuts.

Figure 2:
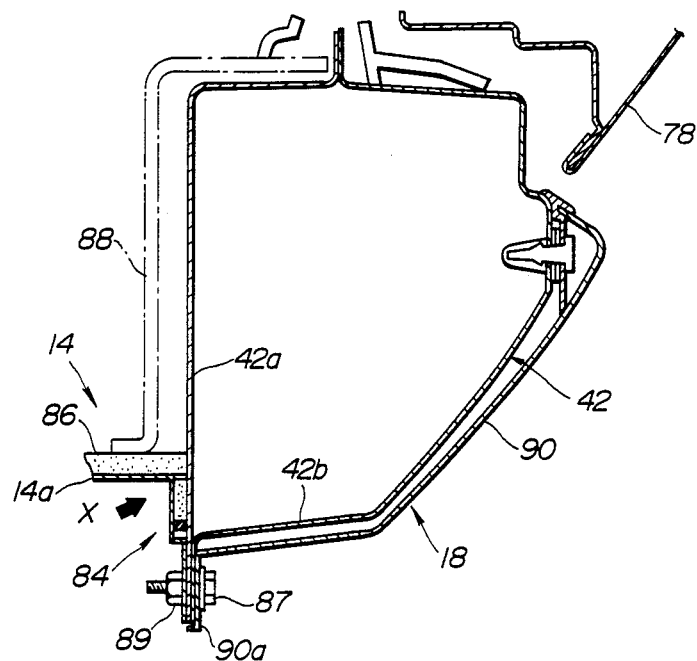
FIG. 2 is an enlarged sectional view of a portion of the modular vehicle body of FIG. 1 in which a sealing system according to an embodiment of the present invention is incorporated.

The modular vehicle body structure 10 is equipped with a sealing system for preventing ingress of foreign substances such as water and dust into the vehicle cabin. In FIG. 2, a sealing system according to an embodiment of the present invention is generally indicated by 84 and is shown as being applied by way of example to the joining portions of the front floor panel 14a and the side sill 42. The front floor panel 14a is covered by a carpet 86. The side sill 42 consists of a side sill inner 42a and a side sill outer 42b which are spot-welded together at the upper and lower flanges thereof to form a rigid vehicle body frame member. A sill finisher 88 and a sill cover 90 are attached to the side sill 42. The sill cover 90 has a lower flange 90a and is fastened thereat to the lower flange 42c of the side sill 42 with bolts 87 and nuts 89.

Figure 3:
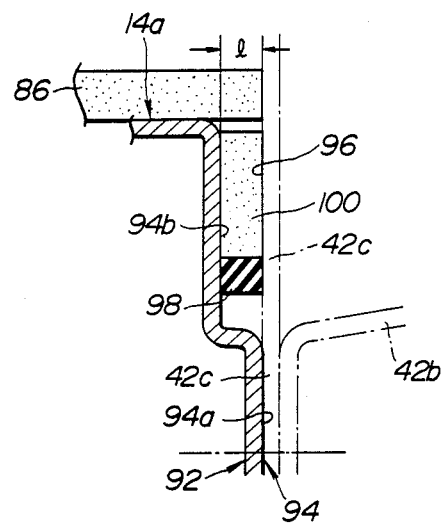
FIG. 3 is an enlarged sectional view of a portion "X" of FIG. 2.

As shown in an enlarged scale in FIG. 3, the front floor panel 14a has at each lateral end a depending flange 92 fastened to the lower flange of the side sill 42 with the bolts 87 and nuts 89 together with the lower flange 42c of the side sill 42. The lateral end flange 92 has on the outer side thereof a vertical joining surface 94 consisting of a lower contact portion 94a and an upper offset portion 94b projecting inwardly from the lower contact portion 94a. The lower contact portion 94a is in direct contact with the lower flange of the side sill 42. The upper offset portion 94b is preferably offset by such an amount that ranges from 1 mm to 2 mm and cooperates with the lower flange 42c of the side sill 42 to define therebetween a chamber 96 within which a dam rubber 98 is disposed. Adhesive sealant 100 is applied into the chamber 96 and assuredly held within same by the effect of the dam rubber 98.

The adhesive sealant 100 is applied into the chamber 96 prior to joining of the flanges 92, 42c and 90a of the front floor panel 14a, side sill 42 and the sill cover 90. After the joining of the flanges 92, 42c and 90a, the adhesive sealant 100 flows downward and is collected on the dam rubber 98 so as not to leave any vacant space in the lower part of the chamber 96.

In the foregoing, it is to be noted that by the effect of the dam rubber 98 the adhesive sealant 100 does not flow out of the chamber 96 but can be assuredly retained within the chamber 96 even in the place where the flange 92 of the front floor panel 14a and the flange 42c of the side sill 42 are not clamped with the bolts 87 and nuts 89.

From the foregoing, it will be understood that the sealing system of the present invention can provide an assured seal between joining portions of a modular vehicle body without requiring an awkward, difficult and time-consuming work.

Figure 4:
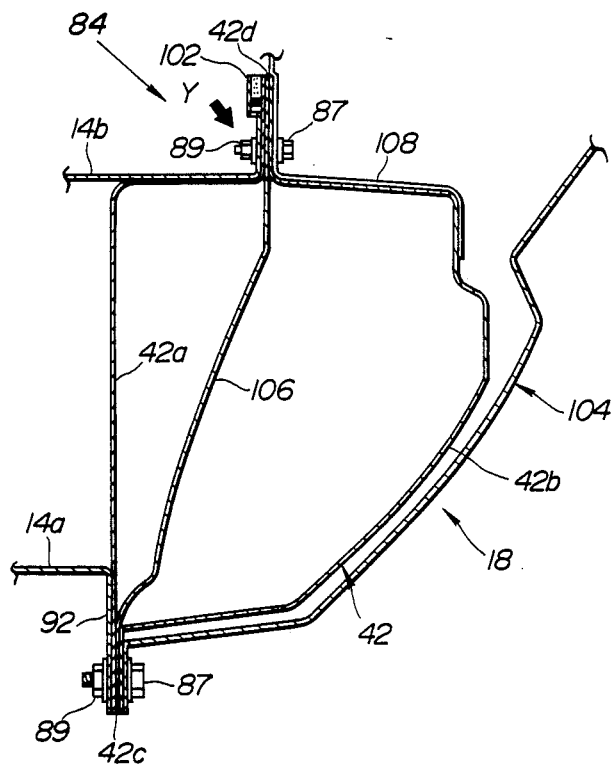
FIG. 4 is an enlarged sectional view of another portion of the modular vehicle body of FIG. 2 in which the sealing system of FIG. 2 is incorporated.
Figure 5:
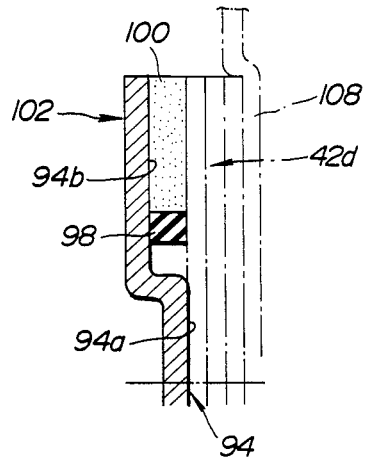
FIG. 5 is an enlarged sectional view of a portion "Y" of FIG. 4.
Figure 6:
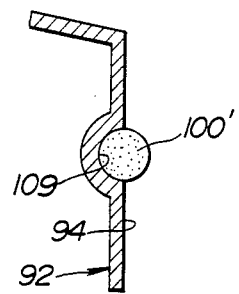
FIG. 6 is a sectional view of the sealing system according to another embodiment of the present invention.
Figure 11:
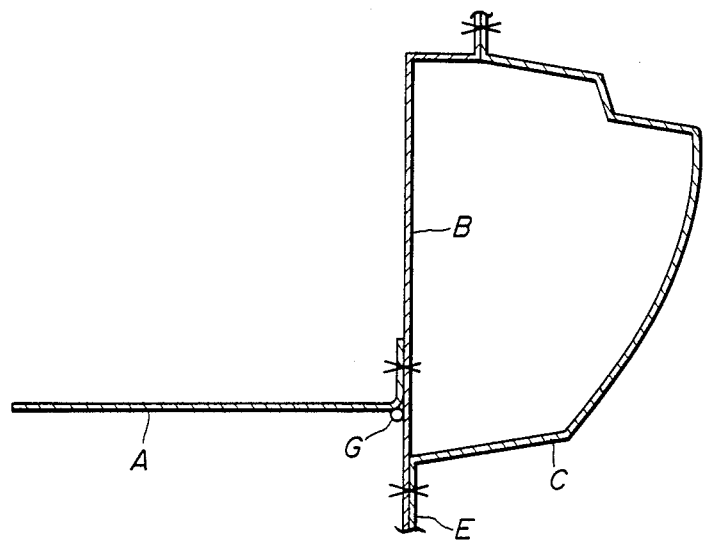
FIG. 11 is a sectional view of a portion of a prior art vehicle body incorporating a prior art sealing system.

In FIGS. 4 and 5, the sealing system 84 is applied to another vehicle body portion in which the upper flange 42d of the side sill 42 is joined with an upstanding lateral end flange 102 of the rear floor panel 14b whilst the lower flange 42c is joined with the lateral end flange 92 of the front floor panel 14a. As seen from FIG. 4, the side sill 42 is further spot-welded at the lower flange 42c to a rear fender outer 104 and a rear pillar inner 106 and at the upper flange 42d to the rear pillar inner 106 and a rear fender inner 108. In this instance, the upstanding flange 102 of the rear floor panel 14b is formed with a joining surface 94. The sealing system 84 therefore can be applied to the vehicle body portion of FIG. 4 in the similar manner to the vehicle body portion of FIG. 2.

In the foregoing, it is to be noted that the joining surface 94 of the flange 92 of the front floor panel 14a or of the flange 102 of the rear floor panel 14b does not necessarily require the offset surface portion 94b but can be flat throughout the entirety. In such a case, the flange 92 is formed with a recess 109 in which adhesive sealant 100' is applied. In such a case, the adhesive sealant 100' needs to have a viscosity larger than a predetermined value. This embodiment can effect substantially the same effect as the previous emboidment.

FIG. 7 shows another embodiment of the present invention. In this embodiment, two kinds of adhesive sealants 110 and 112 are utilized which enable the joining surface 94 to be flat throughout the entirety in order to attain substantially the same effect as the previous embodiment. The first adhesive sealant 110 is low in viscosity but high in adhesiveness whilst the second adhesive sealant 112 is high in viscosity and excellent in the ability of retaining or holding therein the first adhesive sealant 110. As clearly shown in FIGS. 7–9, the second sealant adhesive surrounds the first sealant adhesive 110 to define a space into which said first sealant adhesive 110 is inserted. The second adhesive sealant may be low in adhesiveness.

In the joining of the floor assembly 14 and the body side assembly 18, the first adhesive sealant 100 and the second adhesive sealant 112 are applied to the joining surface 94 of the flange 92' of the front floor panel 14a. The flange 92' is then fastened to the lower flange 42c of the side sill 42 with the bolts 87 and nuts 89. The first adhesive sealant 110 is for example a two-part epoxy adhesive sealant and has a low viscosity and a high adhesiveness. The second adhesive sealant 112 is for example a butyl rubber and has a high viscosity and a low adhesiveness. As shown in FIG. 10, the second adhesive sealant 112 is applied in a latticework or grillwork form on the joining surface 94 while the first adhesive sealant 110 is applied into the spaces surrounded by the second adhesive sealant 112. This is particularly useful when the joining surfaces are vertical as in the case of FIG. 7. By this, the first adhesive sealant 110 can be effectively prevented from flowing out of place.

From the foregoing, it will be understood that the number of bolts and nuts necessary for building the modular vehicle body can be reduced when the adhesive sealant is used in addition, thus making it possible to reduce the weight.

It will be further understood that the adhesive sealant can perform both bonding and sealing assuredly since it can fill any spaces between the joining portions assuredly. For example, even if the joining portions are low in accuracy, such can be compensated for when bolting and bonding are employed at the same time. In this connection, if, as shown in FIG. 12, a sealant "G" needs to be applied to the joining flanges after fastening thereof in the illustrated manner, application of such a sealant "G" inevitably requires an awkward, difficult and time-consuming work and furthermore such a sealant "G" is likely to be stripped off due to small stones flown up by tires to strike against it.

It will be further understood that the sealing and bonding can be attained with a minimum amount of adhesive sealant since there is substantially not any amount of adhesive sealant that can flow out of place according to the present invention.

FIG. 8 shows another example of the sealing system 84 applied to a portion of the modular vehicle body in which the rear end of the lower dash panel 26 is joined with front end of the front floor panel 14a.

FIG. 9 shows a further example of the sealing system 84 applied to a further portion of the modular vehicle body in which a roof 54 is joined with the roof side rail 44.

What is claimed is:

1. A vehicle body structure comprising:
   an engine compartment assembly having a cowl box and a dash lower panel;
   a floor assembly having a front floor panel and a rear floor panel;
   at least one body side assembly having a front pillar, a rear pillar, a roof side rail and a side sill;
   a roof assembly having a roof panel;
   said engine compartment assembly, floor assembly, body side assembly and roof assembly constituting independent vehicle body sections which are prepared and painted independently;
   said engine compartment assembly, floor assembly, body side assembly and roof assembly having joining portions which overlap each other;
   means for joining said joining portions together with bolts, nuts, and a first sealant adhesive;
   said first sealant adhesive being applied in place on one of said joining portions prior to joining of said joining portions; and
   means for holding said first sealant adhesive in place on said one joining portion prior to joining of said joining portions, wherein said holding means comprises a second sealant adhesive which surrounds said first sealant adhesive and which is higher in viscosity than said first sealant adhesive and which is applied to said one joining portion to hold said first sealant adhesive.

2. A vehicle body structure as set forth in claim 1 wherein said second sealant adhesive is applied in a grillwork-like form to define a plurality of independent spaces in which said first sealant adhesive is applied.

3. A vehicle structure as set forth in claim 1 wherein said second sealant adhesive defines on said one joining portion a space in which said first mentioned sealant adhesive is inserted prior to joining of said joining portions.

4. A vehicle structure as set forth in claim 1, wherein said second sealant adhesive is lower in adhesiveness than said first sealant adhesive.

* * * * *